UNITED STATES PATENT OFFICE 2,418,459

PEST CONTROL

Euclid W. Bousquet, Wilmington, Del., assignor to E. I. du Pont de Nemours & Company, Wilmington, Del., a corporation of Delaware No Drawing. Application June 12, 1943, Serial No. 490,641

8 Claims. (Cl. 167—33)

This invention relates to pest control and is particularly directed to methods and compositions for preventing or arresting infestations of insects and other pestiferous organisms, whether plant or animal, such as fungi, bacteria, protozoa, molds and worms, which are economically harmful to man and which commonly infest organic matter, whether plant or animal or of plant or animal origin, either in its natural, fabricated or synthetic state, which compositions distinguish from the processes and compositions known heretofore in the use of the bi-molecular condensate of acetone and m-cresol.

The need for and the desirability of having a truly synthetic organic pest control agent has long been recognized in the art and much research has been carried out for the purpose of discovering such agents. That such research has been only partially effective in accomplishing its object is amply illustrated in the present emergency by our dependency upon imported materials such as rotenone products.

I have now found that the control of noxious pests can be obtained by bringing into contact with the pests a toxic amount of the bi-molecular condensate of acetone and m-cresol.

When applied in a proper manner and a suitable composition this condensate is effective for the control of a variety of pests and especially of chewing insects and red spiders and in many respects is comparable to rotenone in toxicity and range of application. The product, however, has much better solubility in hydrocarbon solvents than rotenone. It is likewise very soluble in polar solvents such as acetone, alcohol, ethyl acetate, etc.; also, in vegetable oils and animal oils, kerosene, naphtha, etc. Thus its range of commercial application from this property alone is substantially increased over rotenone.

The bi-molecular condensate of acetone and m-cresol may be prepared simply by bringing together the two components, namely, acetone and m-cresol, in the presence of a suitable catalyst such as hydrogen chloride. The condensation is believed to take place in such a manner as first to unite one mol of ketone with one mol of phenol with the loss of a mol of water and then to unite two mols of this product, making in effect the condensation product of two mols of m-cresol with two mols of acetone. The product may be termed a dimeride. Alternatively the reaction may take place thru a self-condensation product of ketone such as diacetone alcohol or mesityl oxide with two mols of the phenol.

The precise mechanism by which the phenol and ketone condense is not understood. According to Baker and co-workers, Journal of the Chemical Society, page 1103, (1940) condensation may proceed in such a manner as to give the 2' - hydroxy - 2,4,4,7,4' - pentamethylflavan structure

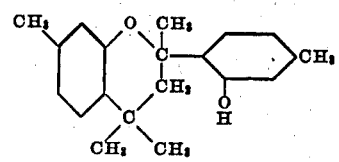

altho they did not confirm this by an independent unambiguous synthesis.

This much, however, is known: (1) that the product is bi-molecular in the sense that two mols of m-cresol and two mols of acetone enter into the condensation product, (2) that two mols of water are lost in the condensation, and (3) that the condensate is characterized by one hydroxyl group which may be esterified and which has such weak phenolic properties as led Baker and co-workers to characterize it as cryptophenolic. The products are not to be confused with well-known products of the character of diphenylol propane obtained by condensing two mols of phenol with only one mol of acetone and with the loss of only one molecule of water.

As illustrative of suitable methods of preparation reference may be had to the following examples in which the parts are by weight unless otherwise specified.

Example 1

A mixture of 648 g. of commercial m-cresol (98–100%) and 232 g. of acetone was cooled to 0° C. and saturated with 75 g. of gaseous hydrochloric acid. After standing at room temperature for from 1 to 3 days a water layer on the bottom of the reaction mixture had formed amounting to 92 cc. (110.5 g.). The product was washed several times with water by decantation and followed by washing of a benzene solution of the product with water until the washings were only slightly acid to litmus. The benzene solution was then vacuum distilled and the benzene, water and excess cresol were removed. Two hundred fifty-four and five-tenths grams of cresol were recovered and the crude product amounted to 525 g. of an orange-yellow resinous material.

This crude material is satisfactory for insecticidal purposes as an examination of subsequent insecticidal data will show. Further purification, however, may be accomplished by distillation and a pure fraction amounting to 85-90% of the crude product may be obtained which boils at 187-190° C./2 mm. This material on analysis is shown to have a molecular weight of 292 as compared to 296 for the calculated value of the bi-molecular condensate. A determination of hydroxyl number gives a value of 185.8 as compared to a calculated value of 182.4. The product is a light yellow thermoplastic sticky resinous material. A colorless material may be obtained by the procedure described in Example 2.

Variations of the procedure in Example 1 in connection with excess of reagents, temperature, catalyst, and method of purification may be employed to obtain the same product. The HCl catalyst may be introduced into the mixture of acetone and cresol at ordinary room temperature. The velocity of reaction increases as the temperature reaches the neighborhood of 40-50° C.

Likewise in place of acetone in the above reaction of Example 1, diacetone alcohol and mesityl oxide may be substituted in the proper mol proportions.

*Example 2*

One hundred grams of the product from Example 1 boiling at 187-190° C./2 mm. is dissolved in a hydrocarbon solvent such as petroleum ether (100 cc.) and to this warm solution is added 40-100 cc. of diethyl ether. The solution is then cooled and a solid precipitate comes out which on filtration and washing with cold ether results in a white crystalline product amounting to about 85% of the theoretical. The product melts at 71-73° C. altho some softening is evidenced at 68° C.

The bi-molecular condensate may be regenerated from this solvate or etherate by simply heating at around 100° C. to remove the ether of crystallization. The resulting product is a colorless, gummy material of the same nature as previously described. The etherate above described on analysis gives values of 78.27% for carbon and 8.64% for hydrogen which corresponds within experimental error to the calculated value for the solvate of the dimeride containing 1 molecule of ether of crystallization.

*Example 3*

A solution of 49 g. of mesityl oxide and 120 g. of m-cresol is saturated with hydrochloric acid gas at 0° C. until 20 g. of HCl has been absorbed. The material is then allowed to stand at room temperature for six days after which it is purified by first scrubbing with water until practically neutral to litmus and then distillation of this scrubbed product. In this way a fraction boiling at 181-187° C./2 mm. is obtained.

*Example 4*

Similarly a mixture of 120 g. of m-cresol (98-100%) and 58 g. of diacetone alcohol when saturated at 0° C. with 27 g. of hydrochloric acid gas and allowed to stand at room temperature for 3 days gives a like product.

*Example 5*

A mixture of 540 g. of cresol (a commercial fraction consisting of approximately 53% m-cresol and 47% p-cresol; boiling range between 199-205° C.) and 232 g. of acetone is saturated at 0° C. with 69 g. of hydrochloric acid gas. After standing at room temperature for 3 days this material is purified in accordance with the method used in the previous Example 1 and a crude product amounting to 411 g. is thereby produced. This product has a molecular weight of 287, and is entirely satisfactory for insecticidal purposes.

The conditions under which the above condensation takes place may be varied considerably with satisfactory results. For example, the time of reaction may be appreciably diminished by starting the reaction at higher initial temperatures. Likewise aqueous hydrochloric acid may be substituted in place of the gaseous reagent altho somewhat superior results have been obtained with the anhydrous product. Thus by suitable choice of conditions and reagents a wide variety of products suitable for insect control are obtained.

I am aware that U. S. Patents 2,217,879, 2,291,192, 2,291,193, 2,291,194 and 1,995,247, and British Patent 528,753 disclose compounds containing a 6-membered oxyheterocyclic ring such as the 2,4-dioxochromans, the xanthanes, xanthydrols, the xanthones and the coumarins. These compounds, however, are quite unlike the condensates above described and none has attained any commercial significance. Moreover, there has been no indication as yet that any of these compounds have rotenone-like properties or would be useful as a rotenone substitute.

My invention may be more fully understood by reference to the following examples in which the parts are by weight unless otherwise specified:

*Example 6*

A solution of one part of 2'-hydroxy-2,4,4,7,4'-pentamethylflaven dissolved in 100 volume-parts of acetone was thoroly mixed with 99 parts of talc to form a paste. The acetone was then evaporated with agitation to form a homogeneous dust. There is thus obtained a product suitable for dusting bean foliage for the control of Mexican bean beetle.

The proportions may be varied to give dust compositions containing greater or less of the active ingredient or the 1% dust may be diluted with talc simply by mechanical admixture therewith to provide more dilute dust.

*Example 7*

25 parts of 2'-hydroxy-2,4,4,7,4'-pentamethylflaven and 1 part of lauryl alcohol (technical n-dodecyl alcohol) is dissolved in 100 volume-parts of acetone. This solution is thoroly mixed with 74 parts of Celite (diatomaceous earth) and dried with agitation to give a homogeneous powder dispersible in water for application as a spray.

*Example 8*

2' - hydroxy - 2,4,4,7,4' - pentamethylflaven was dissolved in acetone to a concentration of 2.5% and 0.25% of a wetting agent known to the trade as IN-438 the active agent of which is the sodium salt of sulfated oleyl acetate. The composition is suitable for dispersing in water to provide a contact insecticide spray for the control of insect pests as aphids and red spider.

In place of the 2'-hydroxy-2,4,4,7,4'-pentamethylflaven in the foregoing examples there may be substituted the crude or distilled products obtained from the condensation of acetone with crude mixtures of m- and p-cresol, or the compounds obtained from m-cresol and condensed or polymerized forms of acetone such as diacetone alcohol and mesityl oxide. There also may be substituted the ether adduct of 2'-hydroxy- 2,4,4,7,4'-pentamethylflaven containing a mol of ether of crystallization.

The foregoing is illustrative of typical compositions. It will be understood, however, that numerous other types of compositions come within the scope of the invention and that variations in the type of compositions illustrated are also within the scope of the invention. It is also to be understood that the concentrations may be varied according to the exigencies of the particular circumstances and according to the requirements of any particular compound. They should be incorporated in such compositions in a fine state of dispersion in a suitable carrier which may be a liquid or a finely divided solid. The dispersed particles should be less than 40 microns in size. If the carrier is an inert solid, particles of the carrier also should be less than 40 microns. The dispersion may be either a molecular dispersion, a micellar dispersion, or a physical dispersion.

compositions, either in the form sold or in the form made up for application, various auxiliary materials such as spreaders, stickers, dispersing agents, flocculating agents and conditioning agents as more particularly set out below.

The relative effectiveness of some of these products is illustrated in the following table. The results were taken with Mexican bean beetle on bean plants dusted with compositions prepared according to Example 6. The tests were made in comparison with calcium arsenate or rotenone controls.

Table I.—Mexican bean beetle larvae

| Ketone-Phenol Condensate (Flavan) | | | | Control | | | |
|---|---|---|---|---|---|---|---|
| Compound | Conc. | Kill | Defoliation | Compound | Conc. | Kill | Defoliation |
| | Per cent | Per cent | Per cent | | Per cent | Per cent | Per cent |
| 2'-hydroxy-2,4,4,7,4'-pentamethylflavan (m-cresol+acetone) | 1.0 | 100 | 2 | | 1.0 | 100 | 5 |
| | 0.5 | 100 | 0 | Calcium arsenate | 0.5 | 27 | 20 |
| | 0.25 | 100 | 2 | | 0.25 | 43 | 15 |
| | 0.1 | 100 | 2 | | 0.1 | 14 | 75 |
| | 0.1 | 100 | 1 | Derris (5% rotenone) | [1] 0.1 | 90 | 0 |
| Ether adduct of 2'-hydroxy-2,4,4,7,4'-pentamethylflavan | 0.5 | 100 | 3 | | 0.5 | 80 | 15 |
| | 0.25 | 100 | 1 | Calcium arsenate | 0.25 | 27 | 25 |
| | 0.1 | 100 | 5 | | 0.25 | 27 | 25 |
| Condensate of diacetone alcohol and m-cresol | 1.0 | 100 | 2 | | 1.0 | 97 | 3 |
| | 0.5 | 97 | Trace | Do | 1.0 | 97 | 3 |
| | 0.25 | 73 | 25 | | 0.25 | 26 | 60 |
| | 0.1 | 30 | 80 | | 1.0 | 97 | 3 |
| Condensate of acetone and crude mixture of m- and p-cresols: | | | | | | | |
| A. Crude | 1.0 | 100 | 0 | | 1.0 | 100 | 3 |
| | 0.5 | 100 | 1 | Do | 1.0 | 100 | 3 |
| | 0.25 | 100 | 2 | | 0.25 | 17 | 15 |
| | 0.1 | 63 | 35 | | 1.0 | 97 | 3 |
| | 0.1 | 63 | 35 | Derris (5% rotenone) | [1] 0.1 | 90 | 0 |
| B. Distilled | 1.0 | 100 | 0 | | 1.0 | 100 | 3 |
| | 0.5 | 100 | 2 | Calcium arsenate | 1.0 | 97 | 3 |
| | 0.25 | 100 | 5 | | 0.25 | 17 | 15 |
| | 0.1 | 43 | 25 | | 0.25 | 17 | 15 |

[1] Contains 0.1% of rotenone plus up to 0.3% total extractives.

Table II illustrates contact properties with respect to red spiders (*Tetranychus telarius*) and *Aphis rumicis*. The compositions were prepared according to Example 4 and sprayed on foliage infested with the pest. Comparison was made with such standard insecticides as Lorol rhodanate (technical N-dodecyl thiocyanate) and rotenone.

Table II.—Contact insecticides (red spiders and Aphis rumicis)

| Ketone-Phenol Condensate (Flavan) | | | | | Control | | | |
|---|---|---|---|---|---|---|---|---|
| Compound | Wetting Agent Conc. | Concentration | Dead Red Spider | Dead Aphis rumicis | Compound | Concentration | Dead Red Spider | Dead Aphis rumicis |
| | | | Per cent | Per cent | | | Per cent | Per cent |
| 2'-hydroxy-2,4,4,7,4'-pentamethylflavan (m-cresol-acetone): | | | | | | | | |
| A. Crude | 1-10000 | 1-1000 | 100 | | Lorol Rhodanate | 1-2000 | 100 | |
| | 1-10000 | 1-2000 | 100 | | | 1-2000 | 100 | |
| | 1-10000 | 1-4000 | 94 | | | 1-2000 | 100 | |
| | 1-2000 | 1-1000 | | 76 | Rotenone (95%) | 1-1000 | 100 | |
| B. Distilled | 1-10000 | 1-1000 | 100 | | Lorol Rhodanate | 1-2000 | 100 | |
| | 1-10000 | 1-2000 | 100 | | | 1-2000 | 100 | |
| | 1-10000 | 1-4000 | 89 | | | 1-2000 | 100 | |
| | 1-2000 | 1-1000 | | 71 | Rotenone (95%) | 1-1000 | 100 | |
| Ether adduct of 2'-hydroxy-2,4,4,7,4'-pentamethylflavan | 1-5000 | 1-500 | 100 | 59 | Lorol Rhodanate | 1-2000 | 59 | 99 |
| Condensate of acetone and crude mixture of m- and p-cresols: | | | | | | | | |
| A. Crude | 1-10000 | 1-1000 | 98 | | | 1-2000 | 100 | |
| | 1-10000 | 1-2000 | 64 | | Do | 1-2000 | 100 | |
| | 1-10000 | 1-4000 | 22 | | | 1-2000 | 100 | |
| | 1-2000 | 1-1000 | | 43 | Rotenone (95%) | 1-1000 | | 100 |
| B. Distilled | 1-2500 | 1-250 | 99 | 56 | | 1-2000 | 59 | 99 |
| | 1-5000 | 1-500 | 91 | 50 | Lorol Rhodanate | 1-2000 | 59 | 99 |
| | 1-10000 | 1-1000 | 75 | 35 | | 1-2000 | 59 | 99 |
| | 1-20000 | 1-2000 | 64 | 32 | | 1-2000 | 59 | 99 |
| Condensate of diacetone alcohol and m-cresol | 1-2500 | 1-250 | 98 | | Do | 1-2000 | 59 | |
| | 1-5000 | 1-500 | 79 | | | 1-2000 | 59 | |

In the first of these the particles will be dispersed as molecules or ions, in the second as groups of molecules and in the third as discrete particles. There may be incorporated in these The compounds responding to the invention are particularly useful as insecticides for the control of chewing insects such as Mexican bean beetle and in some instances for the control of softbodied insect pests such as red spiders. They show a high degree of specificity, some instances, for example being effective against red spider while not so effective for the control of *Aphis rumicis*. They may safely be applied in relatively high concentrations to various types of foliage without injury and may be taken internally in relatively high concentrations by warm-blooded animals.

They may be used in various combinations with such auxiliary materials as spreaders, stickers, and other toxicants; for example, insecticides such as metallic arsenates, fluosilicates, phenothiazines, organic thiocyanates such as n-dodecyl thiocyanate, fenchyl thiocyanoacetate and butyl carbitol thiocyanate, nicotine, anabasine (neonicotine), nor-nicotine, rotenone and its congeners, hellebore, pyrethrum, N-isobutylundecylenamide, aminoethyl sulfides, and bactericides and fungicides such as sulfur, polysulfides such as lime-sulfur, the chlorinated phenols, aminomethyl sulfides, copper acylacetonates, copper chelates of beta-keto acids and esters, copper chelates of salicylaldehyde, Burgundy mixture, Bordeaux mixture, the so-called insoluble coppers such as basic copper sulfates, copper oxychlorides, copper calcium chlorides, copper oxides, copper silicates, copper zeolites, and copper thiocyanates, the long chain quaternary ammonium halides and derivatives of dithiocarbamic acid such as ferric dimethyldithiocarbamate. They may be used in the form of aqueous sprays, dusts or solutions, dispersed with wetting agents such as the alkali metal or amine salts of oleic acid and the sulfated higher alcohols, the sulfonated animal and vegetable oils such as sulfonated fish or castor oils or the sulfonated petroleum oils; with diluents such as calcium phosphate, Bancroft clay, kaolin, diatomaceous earth, sulfur, lime, pyrophyllite, talc, bentonite, flours such as walnut shell, wheat, redwood, soya bean, cottonseed, or with organic solvents such as trichloroethylene, tetrachloroethylene, Stoddard solvent, and other hydrocarbon solvents. They may be used in vegetable and mineral oil sprays in which petroleum or vegetable oil glycerides are used as contact agents or active poisons. Various adhesive and sticking materials such as rosin and glue and various other common adjuvants such as lime may be used. Such mixtures with insecticides and fungicides and insecticidal and fungicidal adjuvants as are here set out may have particular usefulness in special applications and frequently will give better results than would be anticipated from the killing power or repellent action of each ingredient when used alone.

In general, the active agents of this invention may be formulated in a wide variety of ways as may be best suited to the control of any particular pest or combination of pests, having in mind the nature of the pest, its particular habitat and feeding habits, and its peculiar susceptibilities, if any. Thus suitable compositions may be prepared with the active agent in a state of composition, subdivision, and association with other materials such as have been mentioned, such as may be necessary peculiarly to adapt the active agent to the purpose to be effected.

I claim:

1. The method of insect control which comprises contacting the insect with the bi-molecular condensate of acetone and m-cresol said bi-molecular condensate being characterized by molecular weight corresponding to two mols of acetone, plus two mols of cresol, minus two mols of water, and by cryptophenolic properties.

2. The method of insect control which comprises contacting the insect with the bi-molecular condensate of acetone and a mixture of m- and p-cresol said bi-molecular condensate being characterized by molecular weight corresponding to two mols of acetone, plus two mols of cresol, minus two mols of water, and by cryptophenolic properties.

3. An insecticidal composition consisting essentially in a physical dispersion of a toxicant on a finely divided inert having a particle size less than 40 microns containing as an essential active ingredient of said toxicant a bi-molecular condensate of acetone and m-cresol said bi-molecular condensate being characterized by molecular weight corresponding to two mols of acetone, plus two mols of cresol, minus two mols of water, and by cryptophenolic properties.

4. An insecticidal composition containing in admixture with an insecticidal adjuvant the bi-molecular condensate of acetone and m-cresol said bi-molecular condensate being characterized by molecular weight corresponding to two mols of acetone, plus two mols of cresol, minus two mols of water, and by cryptophenolic properties.

5. The method of protecting material from attack by insects which comprises applying to the material subject to attack a bi-molecular condensate of acetone and m-cresol, said bi-molecular condensate being characterized by molecular weight corresponding to two mols of acetone, plus two mols of cresol, minus two mols of water, and by cryptophenolic properties.

6. The method of protecting material from attack by insects which comprises applying to the material subject to attack a bi-molecular condensate of acetone and a mixture of m- and p-cresol, said bi-molecular condensate being characterized by molecular weight corresponding to two mols of acetone, plus two mols of cresol, minus two mols of water, and by cryptophenolic properties.

7. An insecticidal composition containing in solution in a hydrocarbon the bi-molecular condensate of acetone and m-cresol, said bi-molecular condensate being characterized by molecular weight corresponding to two moles of acetone, plus two moles of cresol, minus two moles of water, and by cryptophenolic properties.

8. An insecticidal composition containing in admixture with a wetting agent the bi-molecular condensate of acetone and m-cresol, said bi-molecular condensate being characterized by molecular weight corresponding to two moles of acetone, plus two moles of cresol, minus two moles of water, and by cryptophenolic properties.

EUCLID W. BOUSQUET.